(Model.)
2 Sheets—Sheet 1.
T. J. LINDSAY.
CHECK ROW CORN PLANTER.
No. 296,980.  Patented Apr. 15, 1884.
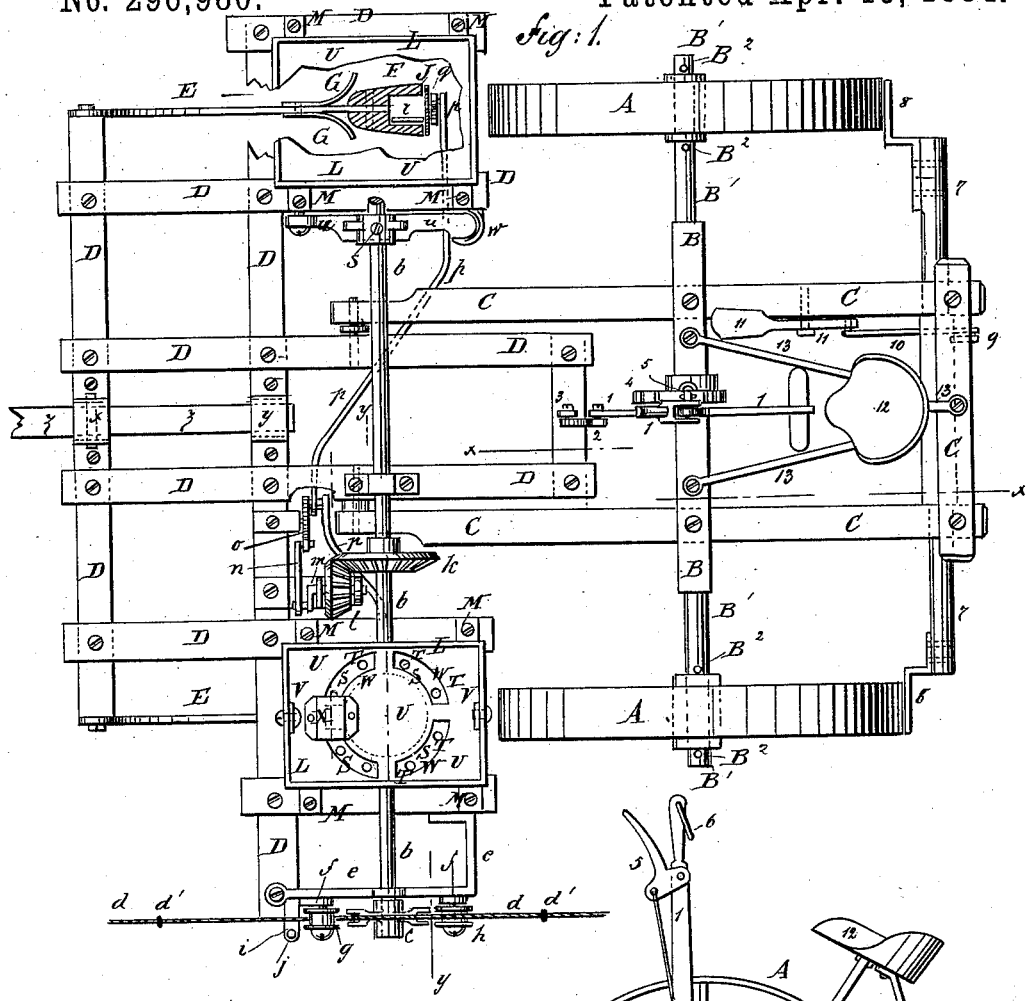
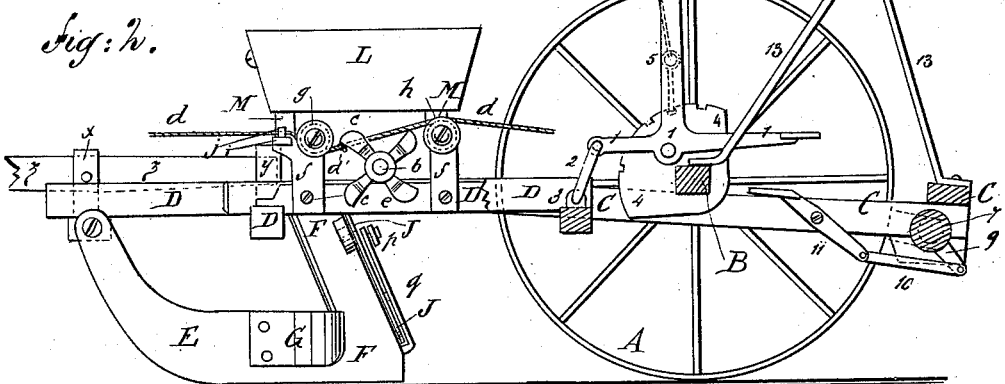
WITNESSES:  
Chas. Nida  
C. Sedgwick
INVENTOR:  
T. J. Lindsay  
BY Munn & Co.  
ATTORNEYS.

(Model.)

T. J. LINDSAY.

CHECK ROW CORN PLANTER.

No. 296,980. Patented Apr. 15, 1884.

WITNESSES:
Chas. Nida
C. Sedgwick

INVENTOR:
T. J. Lindsay
BY Munn & Co
ATTORNEYS.

UNITED STATES PATENT OFFICE.

THOMAS J. LINDSAY, OF LAFAYETTE, INDIANA.

CHECK-ROW CORN-PLANTER.

SPECIFICATION forming part of Letters Patent No. 296,980, dated April 15, 1884.

Application filed July 17, 1883. (Model.)

*To all whom it may concern:*

Be it known that I, THOMAS J. LINDSAY, of Lafayette, in the county of Tippecanoe and State of Indiana, have invented a new and useful Improvement in Check-Row Corn-Planters, of which the following is a full, clear, and exact description.

Reference is to be had to the accompanying drawings, forming a part of this specification, in which similar letters of reference indicate corresponding parts in all the figures.

Figure 3:
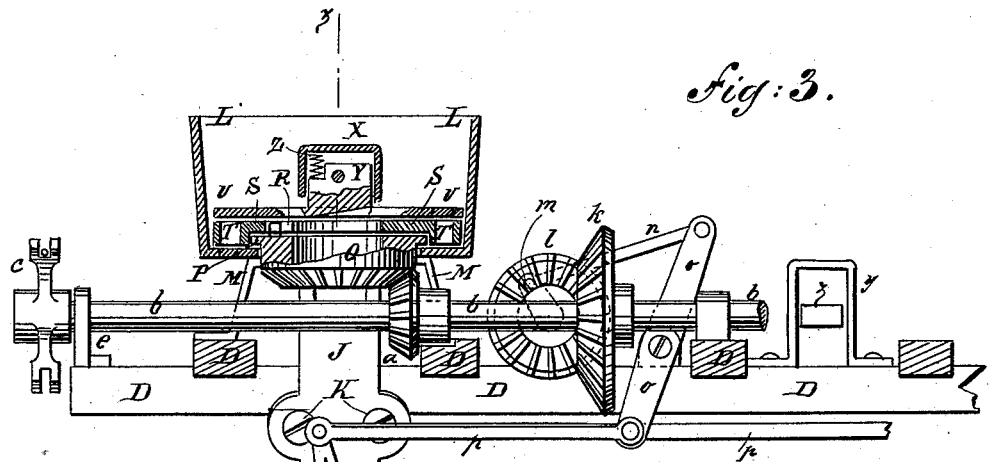
Figure 5:
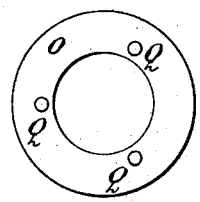
Figure 4:
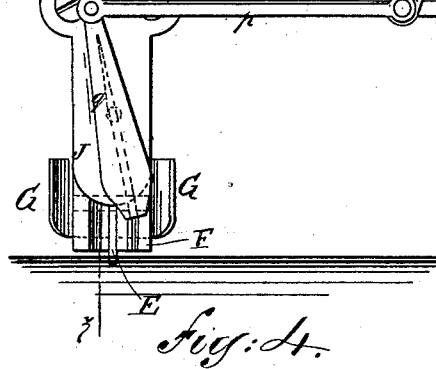
Figure 6:
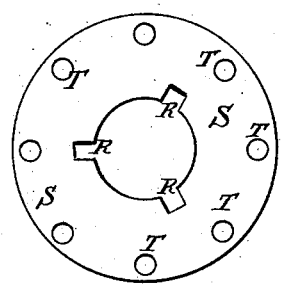
Figure 7:
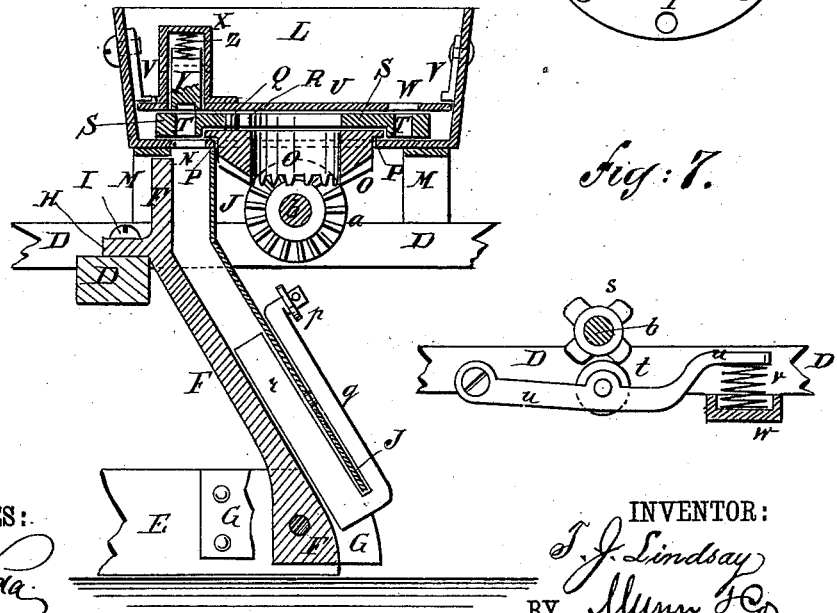

Figure 1, Sheet 1, is a plan view of my improvement, part being broken away. Fig. 2, Sheet 1, is a side elevation of the same, partly in section through the line $x$ $x$, Fig. 1. Fig. 3, Sheet 2, is a sectional rear elevation of a part of the same, taken through the line $y$ $y$, Fig. 1. Fig. 4, Sheet 2, is a sectional side elevation of the seed-box and spout, taken through the line $z$ $z$, Fig. 3. Fig. 5, Sheet 2, is a plan view of the gear-wheel that carries the seed-dropping plate. Fig. 6, Sheet 2, is a plan view of the seed-dropping plate. Fig. 7, Sheet 2, is a side elevation, partly in section, of the device for stopping the shaft.

The object of this invention is to secure accuracy in check-row corn-planting and promote convenience in controlling the planters.

The invention consists of the combination and arrangement of parts, substantially as hereinafter described and claimed.

A are the wheels, the axle B of which is attached to the middle part of the side bars of the frame C. The rims of the wheels A are made wide, to adapt the said wheels to serve as rollers for pressing the soil down upon the seed. The journals B′ of the axle B are made twice the length of the hubs of the wheels A, and are each provided with two linchpins, B²—one at the outer end and the other in the middle of the said journals—so that the said wheels can be placed on the outer parts of the said journals, to press the soil down upon the seed when planting in dry loose soil, and can be placed upon the inner parts of the said journals when planting in wet soil, to prevent the soil from being packed upon the seed. The forward ends of the side bars of the frame C are hinged to the sides of the middle longitudinal bars of the frame D, to allow the machine to adapt itself to uneven ground. The furrows are opened to receive the seed by runners E, the forward ends of which are attached to the forward cross-bar of the frame D, and their rear ends are attached to the lower ends of the conductor-spouts F. To the opposite sides of the rear parts of the runners E are attached plates G, which pass back at the opposite sides of the lower ends of the spouts F, and are curved outward to adapt them to push back and loosen the sides of the furrows, so that the soil will fall into the furrows at the rear of the spouts F and cover the seed. The spouts F are each made in two parts, the lower ends of which are fastened together by the rivets or bolts that secure the rear end of the runners to the said spouts. The forward side of the upper parts of the spouts F have lugs H formed upon them to receive the bolts I, that fasten them to the frame D. The lower ends of the spouts F are inclined to the rearward, as shown in Figs. 2 and 4, so that the seed will be deposited in the ground directly beneath the shaft that drives the seed-dropping plates, which will be hereinafter described. The spouts F have channels in their rear sides, through which the seed passes to the ground, and which are closed by plates J, secured to the said spouts by screws K, as shown in Fig. 3.

L are the seed-boxes, which are attached to supports M, secured to the side parts of the frame D in such positions that the forward parts of the bottoms of the said seed-boxes will rest upon the upper ends of the spouts F, and the discharge-openings N in the said bottoms will be directly over the upper ends of the seed-channels through the said spouts.

In the middle parts of the bottoms of the seed-boxes L are formed circular openings, into which fit the cylindrical upper parts of the beveled gear-wheels O.

Around the tops of the gear-wheels O are formed annular flanges P, which rest upon the upper sides of the seed-box bottoms, and thus support the said gear-wheels.

To the tops of the gear-wheels O are attached three (more or less) upwardly-projecting pins, Q, which enter holes or slots R in the inner edges of the annular plates S, so that the said plates S will be carried around by and with the gear-wheels O in their revolution.

The plates S are made of a larger diameter than the flanged upper ends of the gear-wheels O, and are recessed to receive the said upper ends, so that the outer parts of the said plates S will rest and slide upon the bottoms of the seed-boxes L.

In the outer parts of the plates S are formed openings T of such a size as to contain enough seed for a hill, and in such positions as to come successively over the discharge-openings N in the bottoms of the seed-boxes L and drop the seed into the spouts F. The seed-dropping plates S are covered by the false bottoms U, which are fitted to and supported by the inclined sides of the seed-boxes L in such positions as to be so close to the plates S that kernels of seed cannot pass in between the said bottoms and plates. The false bottoms U are secured in place by buttons V, attached to the sides of the seed-boxes L, or by other suitable means.

In the false bottoms U are formed slots W, curved in the arcs of circles, and in such positions as to be directly over the seed-receiving openings in the plates S, and thus allow the seed to pass freely into the said openings.

To the false bottoms U, directly over the discharge-opening in the true bottoms of the seed-boxes L, are attached housings X, to receive the cut-off blocks Y, which are pivoted at the centers of their upper parts to the sides of the said housings X. The lower sides of the cut-off blocks Y are inclined upward from their forward to their rear ends, and their forward ends are held down by small springs Z, interposed between the said ends and the tops of the said housings X, the said blocks being recessed to receive the said springs, as shown in Fig. 3, so that the seed-dropping plate S will be prevented from carrying out any more seed than enough to fill its seed-receiving holes.

Into the teeth of the beveled gear-wheels O mesh the teeth of the beveled gear-wheels $a$, attached to the shaft $b$, which revolves in bearings attached to the frame D. The teeth of the gear-wheels $a$ O and the distance apart of the seed-receiving holes of the plates S are so arranged that a quarter-revolution of the shaft $b$ and gear-wheels $a$ will turn the seed-dropping plates S through the space between two seed-receiving holes T, so that seed for a hill will be dropped at each quarter-revolution of the shaft $b$.

To the end of the shaft $b$ is attached a four-armed wheel, $c$, having the outer ends of the said arms slotted to receive the check wire or rope $d$. The slots in the arms of the wheel $c$ are made of such a width that the check-rope $d$ can slide through them freely till one of the knots $d'$, formed upon or attached to the said rope, comes in contact with one of the said arms and turns the shaft $b$ through a quarter of a revolution. The forward side of the outer end of each slotted arm of the wheel $c$ is rounded, so that the said arm will readily pass upon the rope $d$, and the rear side of the said end is slightly inclined to the rearward, to prevent the knot $d'$ from slipping off the said end before it has turned the shaft $b$ through a quarter of a revolution. The outer end of the shaft $b$ is journaled in a bearing attached to an iron bar, $e$, secured to the side part of the frame D, and to which are attached two standards, $f$.

To the upper ends of the standards $f$, in front and rear of the upper part of the four-armed wheel $c$, and in the same vertical plane therewith, are pivoted two pulleys, $g$ $h$, to guide the rope $d$ in its passage to and from the said four-armed wheel $c$.

To the forward standard, $f$, is attached, or upon it is formed, an outwardly-projecting arm, $i$, having an upwardly-projecting pin, $j$, attached to or formed upon its outer end, to guide the rope $d$ to and keep it in place upon the pulley $g$. The rope $d$ is stretched across the field in the ordinary manner, passes under the pulley $g$, and over the four-armed wheel $c$ and the pulley $h$, as shown in Fig. 2.

To the shaft $b$, at a little distance from the inner side of one of the seed-boxes L, is secured a beveled gear-wheel, $k$, the teeth of which mesh into the teeth of the beveled gear-wheel $l$, secured to the crank-shaft $m$. The crank-shaft $m$ revolves in bearings attached to the frame D, and to its crank-arm is pivoted the end of a short connecting-bar, $n$, the other end of which is pivoted to the upper end of the lever $o$. The lever $o$ is fulcrumed to a support attached to the frame D, and to its lower end are pivoted the inner ends of two bars, $p$, the outer ends of which are pivoted to the upper ends of two levers, $q$. The levers $q$ are pivoted to the plates J, attached to the rear sides of the spouts F, and the lower ends of the said levers are rigidly attached to the lower ends of the plates $r$, placed within the spouts F, and pivoted to the said spouts in line with the pivots of the levers $q$, so that the said plates will be vibrated by and with the said levers $q$, and will serve as valves to receive the seed as it enters the spouts F, and drop it to the ground in a bunch at the next movement of the said valve.

To the shaft $b$ is attached a four-toothed stop-wheel, $s$, with the teeth of which engages a small roller, $t$, pivoted to lugs formed upon the lever $u$. The lever $u$ is pivoted at one end to the frame D, and its other end rests upon a spiral or other spring, $v$, placed in an open-sided socket, $w$, attached to the said frame D. With this construction, as the shaft $b$ is revolved by the action of the knots $d'$ of the check-rope $d$ upon the four-armed wheel $c$, a tooth of the wheel $s$ will act upon the roller $t$, press the lever $u$ downward, and pass the said roller $t$. As soon as a tooth of the wheel S has passed the roller $t$ the said roller $t$ will be forced up into the space between the teeth of the said wheel $s$ by the action of the spring $v$ upon the lever $u$, and will thus stop the shaft $b$ as it completes each quarter-revolution.

To the first and second cross-bars of the frame D are attached two keepers, $x$ $y$, to receive the rear part of the tongue $z$, and which are made higher than the thickness of the said tongue. The tongue $z$ is pivoted to the forward keeper, $x$, and plays freely in the rear keeper, $y$, so as to act as a loose tongue and allow the machine to adjust itself to uneven ground.

To a support attached to the middle part of the axle B is pivoted the three-armed lever 1, to the end of the forward arm of which is hinged the end of a short connecting bar or link, 2. The other end of the link 2 is hinged to a support, 3, attached to the rear cross-bar of the frame D. The rear arm of the lever 1 projects back into such a position that it can be readily reached and operated by the driver with his feet. The upper arm of the lever 1 projects into such a position that it can be readily reached and operated by the driver with his hand.

To the axle B is attached a bar or plate, 4, the upper edge of which is notched or toothed for the spring-lever pawl 5, connected with the upper arm of the lever 1, to engage with. The pawl 5 can be locked away from the catch-plate 4, giving the frames C D a free play upon each other, by passing a ring or link, 6, hinged to the upper end of the upper arm of the lever 1, over the upper end of the pawl-lever. With this construction the connection between the frames C D can be made rigid and with the said frames in line or at an angle with each other, as desired.

In bearings attached to the rear end of the frame C rocks a roller, 7, to the ends of which are attached plates 8, to serve as scrapers to remove adhering soil from the faces of the wheels A.

To the roller 7 is attached a downwardly-projecting arm, 9, to the end of which is hinged the end of a short connecting-rod, 10. The other end of the rod 10 is hinged to the lower end of the lever 11, which is pivoted to the side bar of the frame C, with its other end projecting into such a position that it can be readily reached and operated by the driver with his feet. With this construction by pushing the upper end of the lever 11 forward the roller 7 will be turned to bring the scrapers 8 into contact with the faces of the wheels A, and by releasing the said lever 11 the weight of the arm 9 and connecting-rod 10 will turn the said roller 7 back into its former position, withdrawing the scrapers 8 from the said wheels.

The driver's seat 12 is attached to supports 13, which are attached to the axle B and frame C.

Having thus fully described my invention, I claim as new and desire to secure by Letters Patent—

1. In a corn-planter, the combination, with the shaft $b$ and the spout F, of the vibrating plate $r$, hung in the spout, and formed with an upwardly-projecting arm or lever, $q$, pivoted upon the outside of the spout, the beveled gear-wheel $k$, crank-shaft $m$, having the beveled pinion $l$, centrally-pivoted lever $o$, and connecting-rods $n$ $p$, substantially as shown and described, and for the purpose specified.

2. In a corn-planter, the revolving serially-apertured plate S, disposed under the coincidently-apertured false bottom U of the seed-holder, the beveled gear-wheel O, the shaft $b$, carrying the pinions $a$ $k$, and crank-shaft $m$, having the beveled pinion $l$, in combination with the vibrating plate or valve $r$, hung in the spout F, and formed with an upwardly-projecting arm or lever, $q$, pivoted on the outside of the spout, centrally-pivoted lever $o$, and connecting-rods $n$ $p$, substantially as and for the purpose set forth.

3. In a corn-planter, the shaft $b$, having the toothed wheel $s$, and the spring-lever $u$, having the roll $t$, in combination with the valve or plate $r$, hung in the spout F, and formed with an upwardly-projecting arm or lever, $q$, pivoted on the outside of the spout, centrally-pivoted lever $o$, and connecting-rods $n$ $p$, substantially as and for the purpose set forth.

4. In a corn-planter, the shaft $b$, carrying the toothed wheel $s$, the spring-lever $u$, having the roll $t$, the rotating serially-apertured plate S, arranged under the coincidently-apertured false bottom U of the seed-hopper, the gearing $a$ $k$ $l$, the crank-shaft $m$, connecting-rods $n$ $p$, centrally-pivoted lever $o$, and the valve or plate $r$, hung in the spout F, and formed with an upwardly-projecting arm or lever, $q$, pivoted upon the outside of the spout, substantially as and for the purpose set forth.

THOMAS J. LINDSAY.

Witnesses:
STEPHEN A. DOUGLASS,
WILLIAM P. McKEY.